US007101923B2

(12) United States Patent
Campbell et al.

(10) Patent No.: US 7,101,923 B2
(45) Date of Patent: *Sep. 5, 2006

(54) FLAME-RETARDANT THERMOSET COMPOSITION, METHOD, AND ARTICLE

(75) Inventors: John Robert Campbell, Clifton Park, NY (US); Bryan Duffey, Ballston Spa, NY (US); John Rude, Ballston Lake, NY (US); Prameela Susarla, Clifton Park, NY (US); Michael Alan Vallance, Loudonville, NY (US); Gary William Yeager, Rexford, NY (US); Kenneth Paul Zarnoch, Scotia, NY (US)

(73) Assignee: General Electric Company, Schenectady, NY (US)

( * ) Notice: Subject to any disclaimer, the term of this patent is extended or adjusted under 35 U.S.C. 154(b) by 366 days.

This patent is subject to a terminal disclaimer.

(21) Appl. No.: 10/678,471

(22) Filed: Oct. 3, 2003

(65) Prior Publication Data

US 2005/0075426 A1   Apr. 7, 2005

(51) Int. Cl.
*C08K 5/5317* (2006.01)

(52) U.S. Cl. ............................ 524/133; 24/140; 24/148
(58) Field of Classification Search ................. 524/133, 524/140, 148
See application file for complete search history.

(56) References Cited

U.S. PATENT DOCUMENTS

| | | |
|---|---|---|
| 3,306,875 A | 2/1967 | Hay |
| 3,375,228 A | 3/1968 | Holoch et al. |
| 4,148,843 A | 4/1979 | Goossens |
| 4,562,243 A | 12/1985 | Percec |
| 4,634,742 A | 1/1987 | Percec |
| 4,663,402 A | 5/1987 | Percec et al. |
| 4,665,137 A | 5/1987 | Percec |
| 4,677,185 A | 6/1987 | Heitz et al. |
| 4,701,514 A | 10/1987 | Percec |
| 4,760,118 A | 7/1988 | White et al. |
| H521 H | 9/1988 | Fan |
| 4,806,601 A | 2/1989 | Percec |
| 4,923,932 A | 5/1990 | Katayose et al. |
| 5,071,922 A | 12/1991 | Nelissen et al. |
| 5,079,268 A | 1/1992 | Nelissen et al. |
| 5,091,480 A | 2/1992 | Percec |
| 5,171,761 A | 12/1992 | Penco et al. |
| 5,218,030 A | 6/1993 | Katayose et al. |
| 5,219,951 A | 6/1993 | Nelissen et al. |
| 5,304,600 A | 4/1994 | Nelissen et al. |
| 5,310,820 A | 5/1994 | Nelissen et al. |
| 5,338,796 A | 8/1994 | Vianello |
| 5,352,745 A | 10/1994 | Katayose et al. |
| 5,407,972 A | 4/1995 | Smith et al. |
| 5,834,565 A | 11/1998 | Tracy et al. |
| 5,965,663 A | 10/1999 | Hayase |
| 5,973,041 A | 10/1999 | Campbell et al. |
| 6,051,662 A | 4/2000 | Tracy et al. |
| 6,221,939 B1 | 4/2001 | Campbell et al. |
| 6,251,308 B1 | 6/2001 | Butler |
| 6,255,371 B1 | 7/2001 | Schlosser et al. |
| 6,352,782 B1 | 3/2002 | Yeager et al. |
| 6,355,832 B1 | 3/2002 | Weferling et al. |
| 6,384,176 B1 | 5/2002 | Braat et al. |
| 6,388,046 B1 | 5/2002 | Campbell et al. |
| 6,469,124 B1 | 10/2002 | Braat et al. |
| 6,521,703 B1 | 2/2003 | Zarnoch et al. |
| 6,534,673 B1 | 3/2003 | Weferling et al. |
| 6,547,992 B1 | 4/2003 | Schlosser et al. |
| 6,569,982 B1 | 5/2003 | Hwang et al. |
| 6,617,398 B1 | 9/2003 | Yeager et al. |
| 6,627,704 B1 | 9/2003 | Yeager et al. |
| 6,627,708 B1 | 9/2003 | Braat et al. |
| 2002/0016420 A1 | 2/2002 | Zarnoch et al. |
| 2002/0169256 A1 | 11/2002 | Merfeld et al. |
| 2002/0173597 A1 | 11/2002 | Zarnoch et al. |
| 2002/0177027 A1 | 11/2002 | Yeager et al. |
| 2003/0096123 A1 | 5/2003 | Yeager |
| 2003/0215588 A1 | 11/2003 | Yeager et al. |

FOREIGN PATENT DOCUMENTS

| | | |
|---|---|---|
| DE | 31 17 514 A1 | 5/1981 |
| DE | 41 03 140 A1 | 2/1991 |
| EP | 0 135 124 A2 | 3/1985 |
| EP | 0 261 574 B1 | 11/1991 |
| WO | WO 01/40354 A1 | 6/2001 |

OTHER PUBLICATIONS

C. Pugh and V. Percec, Polym. Prepr. (Am. Chem. Soc., Div. Polym. Chem.) (1985), 26 (2), 303-5.
Talley, J. Chem. Eng. Data, vol. 33, pp. 221-222 (1988).
"Plastics Additives Handbook, 4th Edition" R. Gachter and H. Muller (eds.), P. P. Klemchuck (assoc. ed.) Hanser Publishers, New York 1993, pp. 901-948.
S. J. Monte et al, Ann. Chem. Tech. Conf. SPI (1980), Ann. Tech. Conf. Reinforced Plastics and Composite Inst. SPI (1979), Section 16E, New Orleans, pp. 1-10.
L. B. Cohen, "Zircoaluminates Strengthen Premium Ranges of Chemical Coupling Agents", Plastics Engineering, vol. 39, No. 11, (1983) pp. 29-32.
S. J. Monte et al., "Coupling Composites With Titanate During Extrusion Process", Modern Plastics, May (1984), pp. 74, 76, and 78.

*Primary Examiner*—Peter Szekely
(74) *Attorney, Agent, or Firm*—Cantor Colburn LLP

(57) ABSTRACT

A curable composition includes a functionalized poly (arylene ether) resin, an acryloyl monomer, and a metallophosphorus flame retardant. The composition exhibits an improved balance of properties such as toughness, flame retardance, heat-resistance, and moisture resistance. It is useful, for example, as an encapsulant for semiconductor products.

47 Claims, No Drawings

FLAME-RETARDANT THERMOSET COMPOSITION, METHOD, AND ARTICLE

BACKGROUND OF THE INVENTION

Curable compositions are often used to encapsulate electronic components. These encapsulating materials must be self-extinguishing in the case of ignition. Commercially available compositions for encapsulation typically employ a combination of halogenated aromatic compounds and antimony oxides to achieve flame retardance. However, the halogenated aromatic compounds interfere with the recycling of electronic devices, and concerns have been raised about health effects associated with antimony oxides. There is therefore a need for flame-retardant encapsulant compositions that reduce or eliminate halogenated aromatic compounds and antimony oxides while maintaining or improving the balance of toughness, heat resistance, and moisture resistance.

BRIEF DESCRIPTION OF THE INVENTION

One embodiment is a curable composition, comprising: a functionalized poly(arylene ether)resin; an acryloyl monomer; and a metallophosphorus flame retardant having the formula

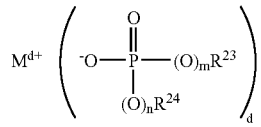

wherein M is Mg, Ca, Al, Sb, Sn, Ge, Ti, Zn, Fe, Zr, Ce, Bi, Sr, Mn, Li, Na, or K; d is 1, 2, 3, or 4 according to the identity of M and its oxidation state; each occurrence of $R^{23}$ and $R^{24}$ is independently $C_1$–$C_{18}$ hydrocarbyl; and each occurrence of m and n is 0 or 1.

Other embodiments, including filled curable compositions, cured compositions, and articles comprising the cured compositions, are described in detail below.

DETAILED DESCRIPTION OF THE INVENTION

The present inventors have found that excellent flame retardance, heat resistance, moisture resistance, and toughness are exhibited by a cured composition comprising the cured product of: a functionalized poly(arylene ether)resin; an acryloyl monomer; and a metallophosphorus flame retardant having the formula

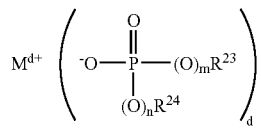

wherein M is Mg, Ca, Al, Sb, Sn, Ge, Ti, Zn, Fe, Zr, Ce, Bi, Sr, Mn, Li, Na, or K; d is 1, 2, 3, or 4 according to the identity of M and its oxidation state; each occurrence of $R^{23}$ and $R^{24}$ is independently $C_1$–$C_{18}$ hydrocarbyl; and each occurrence of m and n is 0 or 1.

The functionalized poly(arylene ether) may be a capped poly(arylene ether), a ring-functionalized poly(arylene ether), or an acid- or anhydride-functionalized poly(arylene ether). A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent.

The capped poly(arylene ether) may be represented by the structure

wherein Q is the residuum of a monohydric, dihydric, or polyhydric phenol, preferably the residuum of a monohydric or dihydric phenol, more preferably the residuum of a monohydric phenol; y is 1 to 100; J comprises repeating structural units having the formula

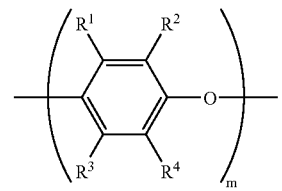

wherein m is 1 to about 200, preferably 2 to about 200, and $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, $C_2$–$C_{12}$ halohydrocarbyloxy wherein at least two carbon atoms separate the halogen and oxygen atoms, or the like; and K is a capping group produced by reaction of a phenolic hydroxyl group on the poly(arylene ether) with a capping agent. The resulting capping group may be

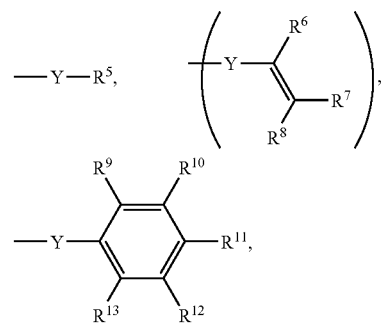

or the like, wherein $R^5$ is $C_1$–$C_{12}$ alkyl, or the like; $R^6$–$R^8$ are each independently hydrogen, $C_1$–$C_{18}$ hydrocarbyl, $C_2$–$C_{18}$ hydrocarbyloxycarbonyl, nitrile, formyl, carboxylate, imidate, thiocarboxylate, or the like; $R^9$–$R^{13}$ are each independently hydrogen, halogen, $C_1$–$C_{12}$ alkyl, hydroxy, amino, or the like; and wherein Y is a divalent group such as

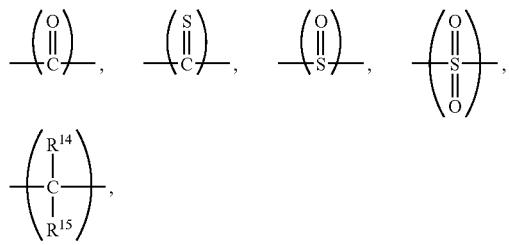

or the like, wherein $R^{14}$ and $R^{15}$ are each independently hydrogen, $C_1$–$C_{12}$ alkyl, or the like. As used herein, "hydrocarbyl" refers to a residue that contains only carbon and hydrogen. The residue may be aliphatic or aromatic, straight-chain, cyclic, bicyclic, branched, saturated, or unsaturated. The hydrocarbyl residue, when so stated however, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, or the like, or it may contain heteroatoms within the backbone of the hydrocarbyl residue.

In one embodiment, Q is the residuum of a phenol, including polyfunctional phenols, and includes radicals of the structure

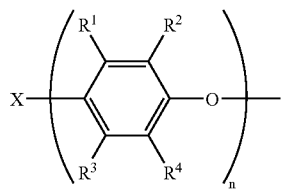

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_1$–$C_{12}$ halohydrocarbyloxy wherein at least two carbon atoms separate the halogen and oxygen atoms, or the like; $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_1$–$C_{12}$ halohydrocarbyloxy wherein at least two carbon atoms separate the halogen and oxygen atoms, or the like; X may be hydrogen, $C_1$–$C_{18}$ hydrocarbyl, or $C_1$–$C_{18}$ hydrocarbyl containing a substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; n (i.e., the number of phenylene ether units bound to X) is 1 to about 100, preferably 1 to 3, and more preferably 1 to 2. Q may be the residuum of a monohydric phenol, such as 2,6-dimethylphenol, in which case n is 1. Q may also be the residuum of a diphenol, such as 2,2',6,6'-tetramethyl-4,4'-diphenol, in which case n is 2.

In one embodiment, the capped poly(arylene ether) is produced by capping a poly(arylene ether) consisting essentially of the polymerization product of at least one monohydric phenol having the structure

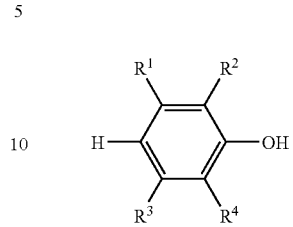

wherein $R^1$ and $R^3$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_1$–$C_{12}$ halohydrocarbyloxy wherein at least two carbon atoms separate the halogen and oxygen atoms, or the like; and $R^2$ and $R^4$ are each independently halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbyloxy, $C_1$–$C_{12}$ halohydrocarbyloxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol.

In one embodiment, the capped poly(arylene ether) comprises at least one capping group having the structure

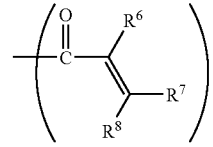

wherein $R^6$–$R^8$ are each independently hydrogen, $C_1$–$C_{18}$ hydrocarbyl, $C_2$–$C_{18}$ hydrocarbyloxycarbonyl, nitrile, formyl, carboxylate, imidate, thiocarboxylate, or the like. Highly preferred capping groups include acrylate ($R^6$=$R^7$=$R^8$=hydrogen) and methacrylate ($R^6$=methyl, $R^7$=$R^8$=hydrogen). It will be understood that the term "(meth)acrylate" means either acrylate or methacrylate.

In another embodiment, the capped poly(arylene ether) comprises at least one capping group having the structure

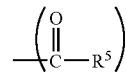

wherein $R^5$ is $C_1$–$C_{12}$ alkyl, preferably $C_1$–$C_6$ alkyl, more preferably methyl, ethyl, or isopropyl. The advantageous properties of the invention can be achieved even when the capped poly(arylene ether) lacks a polymerizable function such as a carbon-carbon double bond.

In yet another embodiment, the capped poly(arylene ether) comprises at least one capping group having the structure

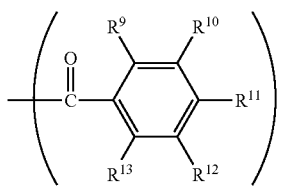

wherein $R^9$–$R^{13}$ are each independently hydrogen, halogen, $C_1$–$C_{12}$ alkyl, hydroxy, amino, or the like. Preferred capping groups of this type include salicylate ($R^9$=hydroxy, $R^{10}$–$R^{13}$=hydrogen).

In still another embodiment, the capped poly(arylene ether) comprises at least one capping group having the structure

wherein A is a saturated or unsaturated $C_2$–$C_{12}$ divalent hydrocarbon group such as, for example, ethylene, 1,2-propylene, 1,3-propylene, 2-methyl-1,3-propylene, 2,2-dimethyl-1,3-propylene, 1,2-butylene, 1,3-butylene, 1,4-butylene, 2-methyl-1,4-butylene, 2,2-dimethyl-1,4-butylene, 2,3-dimethyl-1,4-butylene, vinylene (—CH=CH—), 1,2-phenylene, and the like. These capped poly(arylene ether) resins may conveniently be prepared, for example, by reaction of an uncapped poly(arylene ether) with a cyclic anhydride capping agent. Such cyclic anhydride capping agents include, for example, maleic anhydride, succinic anhydride, glutaric anhydride, adipic anhydride, phthalic anhydride, and the like.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-α,α-dimethylphenylisocyanate, cyanatobenzene, 2,2-bis(4-cyanatophenyl)propane, 3-(α-chloromethyl)styrene, 4-(α-chloromethyl)styrene, allyl bromide, and the like, and substituted derivatives thereof, and mixtures thereof. These and other methods of forming capped poly(arylene ether)s are described, for example, in U.S. Pat. Nos. 3,375,228 to Holoch et al.; 4,148,843 to Goossens; 4,562,243, 4,663,402, 4,665,137, and 5,091,480 to Percec et al.; 5,071,922, 5,079,268, 5,304,600, and 5,310,820 to Nelissen et al.; 5,338,796 to Vianello et al.; U.S. Patent Application Publication No. 2001/0,053,820 A1 to Yeager et al.; and European Patent No. 261,574 B1 to Peters et al.

In a preferred embodiment, the curable composition further comprises an alkenyl aromatic monomer, and the capped poly(arylene ether) is be prepared by reaction of an uncapped poly(arylene ether) with an anhydride in the alkenyl aromatic monomer as solvent. This approach has the advantage of generating the capped poly(arylene ether) in a form that can be immediately blended with other components to form a curable composition. Using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described above. Useful materials include, but are not limited to, basic compounds including, for example, basic compound hydroxide salts such as sodium hydroxide, potassium hydroxide, tetraalkylammonium hydroxides, and the like; tertiary alkylamines such as tributyl amine, triethylamine, dimethylbenzylamine, dimethylbutylamine and the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The functionalized poly(arylene ether) may be a ring-functionalized poly(arylene ether). In one embodiment, the ring-functionalized poly(arylene ether) is a poly(arylene ether) comprising repeating structural units of the formula

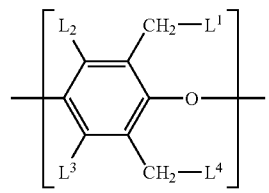

wherein each $L^1$–$L^4$ is independently hydrogen, a $C_1$–$C_{12}$ alkyl group, an alkenyl group, or an alkynyl group; wherein the alkenyl group is represented by

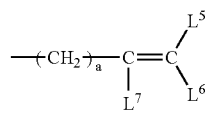

wherein $L^5$–$L^7$ are independently hydrogen or methyl, and a is an integer from 0 to 4; wherein the alkynyl group is represented by

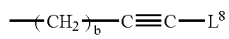

wherein $L^8$ is hydrogen, methyl, or ethyl, and b is an integer from 0 to 4; and wherein about 0.02 mole percent to about 25 mole percent of the total $L^1$–$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

The ring-functionalized poly(arylene ether) may be prepared according to known methods. For example, an unfunctionalized poly(arylene ether) such as poly(2,6-dimethyl-1,4-phenylene ether) may be metallized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

In another embodiment, the functionalized poly(arylene ether) is the product of the melt reaction of a poly(arylene ether) and an α,β-unsaturated carbonyl compound or a β-hydroxy carbonyl compound to produce an acid- or anhydride-functionalized poly(arylene ether). In some embodiments both acid and anhydride functionality may be present. Examples of α,β-unsaturated carbonyl compounds include, for example, fumaric acid, maleic acid, maleic anhydride, itaconic acid, itaconic anhydride, citraconic acid, citraconic anhydride, as well as various derivatives of the foregoing and similar compounds. Examples of β-hydroxy carbonyl compounds include, for example, citric acid, malic acid, and the like. Such functionalization is typically carried out by melt mixing the poly(arylene ether) with the desired carbonyl compound at a temperature of about 190 to about 290° C.

There is no particular limitation on the molecular weight or intrinsic viscosity of the functionalized poly(arylene ether). In one embodiment, the composition may comprise a functionalized poly(arylene ether) having a number average molecular weight of about 1,000 to about 25,000 atomic mass units (AMU). Within this range, it may be preferable to use a functionalized poly(arylene ether) having a number average molecular weight of at least about 2,000 AMU, more preferably at least about 4,000 AMU. In another embodiment, the composition may comprise a functionalized poly(arylene ether) having an intrinsic viscosity of about 0.05 to about 0.6 deciliters per gram (dL/g) as measured in chloroform at 25° C. Within this range, the functionalized poly(arylene ether) intrinsic viscosity may preferably be at least about 0.08 dL/g, more preferably at least about 0.1 dL/g. Also within this range, the functionalized poly(arylene ether) intrinsic viscosity may preferably be up to about 0.5 dL/g, still more preferably up to about 0.4 dL/g. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly(arylene ether). It is expressly contemplated to employ blends of at least two functionalized poly(arylene ether)s having different molecular weights and intrinsic viscosities. The composition may comprise a blend of at least two functionalized poly(arylene ethers). Such blends may be prepared from individually prepared and isolated functionalized poly(arylene ethers). Alternatively, such blends may be prepared by reacting a single poly(arylene ether) with at least two functionalizing agents. For example, a poly(arylene ether) may be reacted with two capping agents, or a poly(arylene ether) may be metallized and reacted with two unsaturated alkylating agents. In another alternative, a mixture of at least two poly(arylene ether)resins having different monomer compositions and/or molecular weights may be reacted with a single functionalizing agent. The composition may, optionally, comprise a blend of a functionalized poly(arylene ether)resin and an unfunctionalized poly(arylene ether)resin, and these two components may, optionally, have different intrinsic viscosities.

The curable composition may comprise about 5 to about 90 parts by weight of the functionalized poly(arylene ether) per 100 parts by weight total of the functionalized poly(arylene ether) and the acryloyl monomer. Within this range, the amount of the functionalized poly(arylene ether)resin may preferably be at least about 10 parts by weight, more preferably at least about 15 parts by weight. Also within this range, the amount of the functionalized poly(arylene ether) resin may preferably be up about 80 parts by weight, more preferably up to about 60 parts by weight, still more preferably up to about 50 parts by weight.

The composition comprises an acryloyl monomer. In one embodiment, the acryloyl monomer comprises at least one acryloyl moiety having the structure

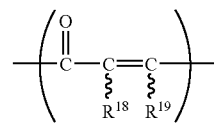

wherein $R^{18}$ and $R^{19}$ are each independently selected from the group consisting of hydrogen and $C_1$–$C_{12}$ alkyl, and wherein $R^{18}$ and $R^{19}$ may be disposed either cis or trans about the carbon-carbon double bond. Examples of acryloyl monomers having the above structure include, for example, unsaturated polyester resins obtained by reaction of at least one polyhydric alcohol with at least one polybasic acid comprising an unsaturated polybasic acid. Suitable unsaturated polyester resins are described, for example, in U.S. Pat. No. 6,521,703 to Zamoch et al.

In another embodiment, the acryloyl monomer comprises at least one acryloyl moiety having the structure

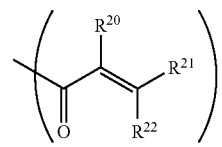

wherein $R^{20}$–$R^{22}$ are each independently selected from the group consisting of hydrogen, $C_1$–$C_{12}$ hydrocarbyl, $C_2$–$C_{18}$ hydrocarbyloxycarbonyl, nitrile, formyl, carboxylate, imidate, and thiocarboxylate. In one embodiment, the acryloyl monomer comprises at least two acryloyl moieties. In another embodiment, the acryloyl monomer comprises at least three acryloyl moieties. Suitable acryloyl monomers include, for example, trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl(meth)acrylate, ethoxylated (2) bisphenol A di(meth)acrylate (it will be understood that the number following the ethoxylated term refers to the average number of ethoxy groups in the ethoxylate chains attached to each oxygen of bisphenol A), and the like, and mixtures comprising at least one of the foregoing acryloyl monomers.

The composition may comprise about 10 to about 95 parts acryloyl monomer per 100 parts by weight total of the functionalized poly(arylene ether) and the acryloyl monomer. Within this range, the amount of the acryloyl monomer may preferably be at least about 20 parts by weight, more preferably at least about 30 parts by weight, still more preferably at least about 40 parts by weight. Also within this range, the amount of the acryloyl monomer may preferably be up to about 90 parts by weight, more preferably up to about 85 parts by weight, still more preferably up to about 80 parts by weight.

The composition comprises a metallophosphorus flame retardant having the formula

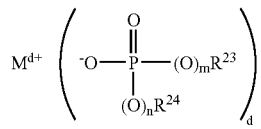

wherein M is Mg, Ca, Al, Sb, Sn, Ge, Ti, Zn, Fe, Zr, Ce, Bi, Sr, Mn, Li, Na, or K; d is 1, 2, 3, or 4 according to the identity of M and its oxidation state; each occurrence of $R^{23}$ and $R^{24}$ is independently $C_1$–$C_{18}$ hydrocarbyl; and each occurrence of m and n is 0 or 1. $M^{d+}$ may be, for example, $Mg^{2+}$, $Ca^{2+}$, $Al^{3+}$, $Sb^{3+}$, $Sn^{4+}$, $G^{4+}$, $Ti^{4+}$, $Zn^{2+}$, $Fe^{2+}$, $Fe^{3+}$, $Ce^{3+}$, $Ce^{4+}$, $Bi^{3+}$, $Sr^{2+}$, $Mn^{2+}$, $Mn^{3+}$, $Mn^{4+}$, $Li^+$, $Na^+$, or $K^+$. In one embodiment, $M^{d+}$ is $Al^{3+}$ or $Zn^{2+}$. In another embodiment, $M^{d+}$ is $Al^{3+}$. In one embodiment, each occurrence of $R^{23}$ and $R^{24}$ is independently $C_1$–$C_6$ alkyl. In another embodiment, each occurrence of $R^{23}$ and $R^{24}$ is methyl or ethyl. In one embodiment, each occurrence of m and n is zero. Suitable metallophosphorus flame retardants include, for example, metal salts of dimethylphosphinate, diethylphosphinate, di-n-propylphosphinate, di-n-butylphosphinate, di-n-hexylphosphinate, dicyclohexylphosphinate, di-2-ethylhexylphosphinate, diphenylphosphinate, di-o-tolylphosphinate, dimethylphosphonate, diethylphosphonate, di-n-propylphosphonate, di-n-butylphosphonate, di-n-hexylphosphonate, dicyclohexylphosphonate, di-2-ethylhexylphoshate, diphenylphosphonate, di-o-tolylphosphonate, dimethylphosphate, diethylphosphate, di-n-propylphosphate, di-n-butylphosphate, di-n-hexylphosphate, dicyclohexylphosphate, di-2-ethylhexylphoshate, diphenylphosphate, di-o-tolylphosphate, and the like, and mixtures thereof. A preferred metallophosphorus flame retardant is aluminum tris(diethylphosphinate). Preparation of metallophosphorus flame retardants is described, for example, in U.S. Pat. Nos. 6,255,371 and 6,547,992 to Schlosser et al., and 6,355,832 and 6,534,673 to Weferling et al.

The composition may comprise about 0.1 to about 50 parts by weight of the metallophosphorus flame retardant per 100 parts by weight total of the functionalized poly(arylene ether) and the acryloyl monomer. Within this range, the metallophosphorus flame retardant amount may preferably be at least about 1 part by weight, more preferably at least about 4 parts by weight, still more preferably at least about 8 parts by weight. Also within this range, the metallophosphorus flame retardant amount may preferably be up to about 40 parts by weight, more preferably up to about 30 parts by weight, still more preferably up to about 20 parts by weight.

The composition may, optionally, comprise additional flame retardants. In one embodiment, the composition comprises an aromatic bisphosphoramidate flame retardant of the formula

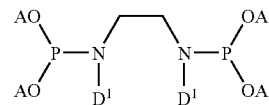

wherein A is a monocyclic aromatic radical and $D^1$ is a $C_{1-4}$ primary or secondary alkyl radical or both $D^1$ radicals taken together are ethylene. The monocyclic aromatic radical A may be, for example, an aromatic hydrocarbon radical or substituted aromatic hydrocarbon radical wherein the substituent(s) may be, for example, alkyl, alkoxy, nitro or carbalkoxy groups. The preferred aromatic radicals are phenyl, 2,6-dialkylphenyl (especially 2,6-xylyl), and 2,3,6-trialkylphenyl or 2,4,6-trialkylphenyl (especially 2,3,6-trimethylphenyl or 2,4,6-trimethylphenyl). Each $D^1$ radical is primary or secondary $C_{1-4}$ alkyl, preferably methyl, or both of said radicals taken together are ethylene. Bisphosphoramidates of the desired molecular structure may be prepared by the reaction of a corresponding secondary diamine such as piperazine or N,N'-dimethylethylenediamine with a diaryl chlorophosphate of the formula $(AO)_2POCl$ in the presence of a tertiary amine. This method of preparation is described in Talley, J. Chem. Eng. Data, volume 33, pages 221–222 (1988). When present, the aromatic bisphosphoramidate may be used in an amount of about 0.1 to about 30 parts by weight per 100 parts by weight total of the functionalized poly(arylene ether) and the acryloyl monomer.

In another embodiment, the composition optionally comprises an aromatic polyphosphate flame retardant having the formula

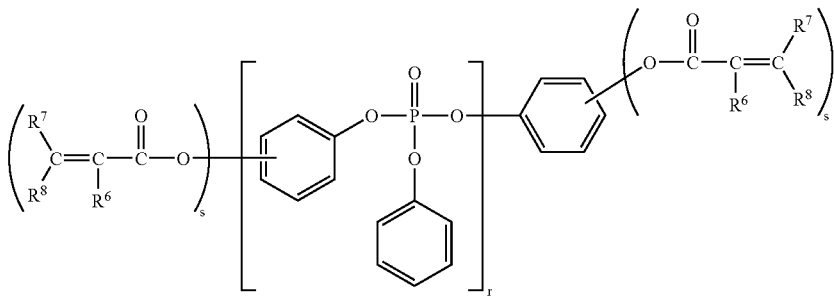

wherein each occurrence of R6–R⁸ is independently selected from the group consisting of hydrogen, $C_1$–$C_{18}$ hydrocarbyl, $C_2$–$C_{12}$ hydrocarbyloxycarbonyl, nitrile, formyl, carboxylate, imidate, and thiocarboxylate; r is 2 to about 20; and each occurrence of s is 0, 1, or 2, with the proviso that at least one occurrence of s is 1. Preferably, each occurrence of $R^6$ is hydrogen or methyl, each occurrence of $R^7$ and $R^8$ is hydrogen, r is 2 to about 10, and each occurrence of s is 1. The aromatic polyphosphate flame retardant may be prepared by reacting phenyl dichlorophosphate with an excess of the dihydroxybenzene of interest in the presence of magnesium or aluminum chloride to give the bis(hydroxyphenyl)phenyl phosphate; this material is then reacted with the appropriate acryloyl chloride in the presence of an acid acceptor such as a tertiary amine to give the structure of interest. When present, the aromatic polyphosphate flame retardant may be used in an amount of about 0.1 to about 30 parts by weight per 100 parts by weight total of the functionalized poly(arylene ether) and the acryloyl monomer. The composition may, optionally, include additional flame retardants including, for example, antimony oxides (e.g., $Sb_2O_5$ and $Sb_2O_3$), magnesium hydroxide, the diglycidyl ether of tetrabromobisphenol A, dibromostyrenes, and the like.

The composition may, optionally, further comprise an alkenyl aromatic monomer. The alkenyl aromatic monomer may have the formula

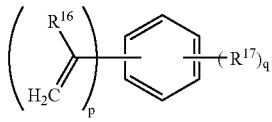

wherein each occurrence of $R^{16}$ is independently hydrogen or $C_1$–$C_{18}$ hydrocarbyl; each occurrence of $R^{17}$ is independently halogen, $C_1$–$C_{12}$ alkyl, $C_1$–$C_{12}$ alkoxyl, or $C_6$–$C_{18}$ aryl; p is 1 to 4; and q is 0 to 5. Unspecified positions on the aromatic ring are substituted with hydrogen atoms. Suitable alkenyl aromatic monomers include, for example, styrene, a-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. When the composition comprises an alkenyl aromatic monomer, it may be present at about 10 to about 500 parts by weight alkenyl aromatic monomer per 100 parts by weight total of the functionalized poly(arylene ether) and the acryloyl monomer. Within this range, it may be preferable to use an alkenyl aromatic monomer amount of at least about 25 parts by weight, more preferably at least about 50 parts by weight. Also within this range, it may be preferable to use an alkenyl aromatic monomer amount of up to about 300 parts by weight, more preferably up to about 100 parts by weight.

The composition may, optionally, further comprise an allylic monomer. An allylic monomer is an organic compound comprising at least one, preferably at least two, more preferably at least three allyl (—$CH_2$—CH=$CH_2$) groups. Suitable allylic monomers include, for example, diallyl phthalate, diallyl isophthalate, triallyl mellitate, triallyl mesate, triallyl benzenes, triallyl cyanurate, triallyl isocyanurate, mixtures thereof, partial polymerization products prepared therefrom, and the like. When the composition comprises an allylic monomer, it may be present at about 10 to about 500 parts by weight allylic monomer per 100 parts by weight total of the functionalized poly(arylene ether) and the acryloyl monomer. Within this range, it may be preferable to use an allylic monomer amount of at least about 25 parts by weight, more preferably at least about 50 parts by weight. Also within this range, it may be preferable to use an allylic monomer amount of up to about 300 parts by weight, more preferably up to about 100 parts by weight.

The curable composition may, optionally, further comprise a curing catalyst to increase the curing rate of the unsaturated components. Curing catalysts, also referred to as initiators, are well known to the art and may be used to initiate the polymerization, cure or crosslink any of numerous thermoplastics and thermosets including unsaturated polyester, vinyl ester and allylic thermosets. Non-limiting examples of curing catalysts are those described in U.S. Pat. Nos. 5,407,972 to Smith et al., and 5,218,030 to Katayose et al. The curing catalyst for the unsaturated portion of the thermoset may include any compound capable of producing free radicals at elevated temperatures. Such curing catalysts may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy)isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures comprising at least one of the foregoing curing catalysts. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts. The curing catalyst for the unsaturated portion of the thermoset may further include any compound capable of initiating anionic polymerization of the unsaturated components. Such anionic polymerization catalysts include, for example, alkali metal amides, such as sodium amide ($NaNH_2$) and lithium diethyl amide ($LiN(C_2H_5)_2$); alkali metal and ammonium salts of $C_1$–$C_{10}$ alkoxides; alkali metal and ammonium hydroxides; alkali metal cyanides; organometallic compounds such as the alkyl lithium compound n-butyl lithium and the Grignard reagent phenyl magnesium bromide; and the like; and combinations comprising at least one of the foregoing anionic polymerization catalysts.

In a preferred embodiment, the curing catalyst may comprise t-butylperoxybenzoate or dicumyl peroxide. The curing catalyst may promote curing at a temperature of about 0° C. to about 200° C.

When present, the curing catalyst may be used in an amount of about 0.1 to about 10 parts by weight per 100 parts total of the functionalized poly(arylene ether) and the acryloyl monomer. Within this range, it may be preferred to use a curing catalyst amount of at least about 0.5 parts by weight, more preferably at least about 1 part by weight. Also within this range, it may be preferred to use a curing catalyst amount of up to about 5 parts by weight, more preferably up to about 3 parts by weight.

The curable composition may, optionally, further comprise a curing promoter to decrease the gel time. Suitable curing promoters include transition metal salts and complexes such as cobalt naphthanate; and organic bases such as N,N-dimethylaniline (DMA) and N,N-diethylaniline (DEA). Preferably, cobalt naphthanate and DMA are used in combination. When present, the promoter may be used in an amount of about 0.05 to about 3 parts, per 100 parts total of the functionalized poly(arylene ether) and the acryloyl monomer.

The composition may, optionally, further comprise a curing inhibitor, which functions to prevent premature curing of the composition. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, $C_1$–$C_6$-alkyl-substituted catechols, dialkylhydroquinone, 2,4,6-dichloronitrophenol, halogen-ortho-nitrophenols, alkoxyhydroquinone, mono- and di- and polysulfides of phenols and catechols, thiols and oximes and hydrazones of quinone, phenothiazine, dialkylhydroxylamines, and the like, and combinations comprising at least one of the foregoing curing inhibitors. Preferred curing inhibitors include benzoquinone, hydroquinone, and tert-butylcatechol. When present, the curing inhibitor amount may be about 0.01 to about 10 parts by weight, per 100 parts by weight total of the functionalized poly(arylene ether)resin and the acryloyl monomer. Within this range, the curing inhibitor amount may preferably be at least about 0.1 part by weight. Also within this range, the curing inhibitor amount may preferably be up to about 2 parts by weight.

The composition may further comprise one or more fillers, including particulate fillers and fibrous fillers. Examples of such fillers well known to the art include those described in "Plastic Additives Handbook, 4$^{th}$ Edition" R. Gachter and H. Muller (eds.), P. P. Klemchuck (assoc. ed.) Hanser Publishers, New York 1993, pages 901–948. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having high thermal conductivity, low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (in its anhydrous, hemihydrated, dihydrated, or trihydrated forms), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, modular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physical properties to compounded blends; feldspar and nepheline syenite; silicate spheres; flue dust; cenospheres; fillite; aluminosilicate (armospheres), including silanized and metalized aluminosilicate; natural silica sand; quartz; quartzite; perlite; Tripoli; diatomaceous earth; synthetic silica, including those with various silane coatings, and the like.

Preferred particulate fillers include fused silica having an average particle size of about 1 to about 50 micrometers. A particularly preferred particulate filler comprises a first fused silica having a an average particle size of about 0.03 micrometer to less than 1 micrometer, and a second fused silica having an average particle size of at least 1 micrometer to about 30 micrometers. The preferred fused silicas have essentially spherical particles, typically achieved by re-melting. Within the size range specified above, the first fused silica may preferably have an average particle size of at least about 0.1 micrometer, preferably at least about 0.2 micrometer. Also within the size range above, the first fused silica may preferably have an average particle size of up to about 0.9 micrometer, more preferably up to about 0.8 micrometer. Within the size range specified above, the second fused silica may preferably have an average particle size of at least about 2 micrometers, preferably at least about 4 micrometers. Also within the size range above, the second fused silica may preferably have an average particle size of up to about 25 micrometers, more preferably up to about 20 micrometers. In one embodiment, the composition comprises the first fused silica and the second fused silica in a weight ratio of about 70:30 to about 99:1, preferably about 80:20 to about 95:5.

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Preferred fibrous fillers include glass fibers having a diameter of about 5 to about 25 micrometers and a length before compounding of about 0.5 to about 4 centimeters. Many other suitable fillers are described in U.S. Patent Application Publication No. 2001/0,053,820 A1 to Yeager et al.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1–3, R is an alkyl or aryl group and Y is a reactive functional group which can enable formation of a bond with a polymer molecule. Particularly useful examples of coupling agents are those having the structure $(RO)_3SiY$. Typical examples include vinyl triethoxysilane, vinyl tris(2-methoxy)silane, phenyl trimethoxysilane, γ-methacryloxypropyltrimethoxy silane, γ-aminopropyltriethoxysilane, γ-glycidoxypropyltrimethoxysilane, γ-mercaptopropyltrimethoxysilane, and the like. Silanes further include molecules lacking a reactive functional group, such as, for example, trimethoxyphenylsilane. Titanates include those developed by S. J. Monte et al. in Ann. Chem. Tech Conf. SPI (1980), Ann. Tech Conf. Reinforced Plastics and Composite Inst. SPI 1979, Section 16E, New Orleans; and S. J. Monte, Mod. Plastics Int., volume 14, number 6 pg. 2 (1984). Zirco-aluminates include those described by L. B. Cohen in Plastics Engineering, volume 39, number 11, page 29 (1983). The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

When present, the particulate filler may be used in an amount of about 5 to about 95 weight percent, based on the total weight of the composition. Within this range, it may be preferable to use a particulate filler amount of at least about 20 weight percent, more preferably at least about 40 weight percent. Also within this range, it may be preferable to use a particulate filler amount of up to about 93 weight percent, more preferably up to about 91 weight percent.

When present, the fibrous filler may be used in an amount of about 2 to about 80 weight percent, based on the total weight of the composition. Within this range, it may be preferable to use a fibrous filler amount of at least about 5 weight percent, more preferably at least about 10 weight percent, yet more preferably at least about 15 weight percent. Also within this range, it may be preferred to use a fibrous filler amount of up to about 60 weight percent, more preferably up to about 40 weight percent, still more preferably up to about 30 weight percent.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, antioxidants, heat stabilizers, light stabilizers, plasticizers, lubricants, flow modifiers, drip retardants, antiblocking agents, antistatic agents, flow-promoting agents, processing aids, substrate adhesion agents, mold release agents, toughening agents, low-profile additives, stress-relief additives, and the like, and combinations thereof. Those skilled in the art may select suitable additives and determine suitable amounts.

One embodiment is a curable composition, comprising: a (meth)acrylate-capped poly(2,6-dimethyl-1,4-phenylene ether)resin, a (meth)acrylate-capped poly(2,6-dimethyl-1,4-phenylene ether-co-2,3,6-trimethyl-1,4-phenylene ether) resin, or a mixture thereof; an acryloyl monomer selected from trimethylolpropane tri(meth)acrylate, hexanediol di(meth)acrylate, cyclohexanedimethanol di(meth)acrylate, methacryloxypropyl trimethoxysilane, ethoxylated (2) bisphenol A di(meth)acrylate, or a mixture thereof; an aluminophosphorus flame retardant having the formula

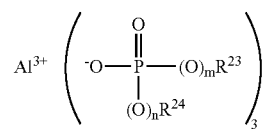

wherein each occurrence of $R^{23}$ and $R^{24}$ is independently $C_1$–$C_6$ alkyl, and each occurrence of m and n is 0; and fused silica.

Another embodiment is a curable composition, comprising: about 5 to abut 40 parts by weight of a (meth)acrylate-capped poly(2,6-dimethyl-1,4-phenylene ether)resin, a (meth)acrylate-capped poly(2,6-dimethyl-1,4-phenylene ether-co-2,3,6-trimethyl-1,4-phenylene ether)resin, or a mixture thereof; about 60 to about 9 parts by weight of an acryloyl monomer selected from trimethylolpropane tri (meth)acrylate, hexanediol di(meth)acrylate, cyclohexanedimethanol di(meth)acrylate, methacryloxypropyl trimethoxysilane, ethoxylated (2)bisphenol A di(meth) acrylate, or a mixture thereof; about 1 to about 50 parts by weight of aluminum tris(diethylphosphinate); and about 100 to about 2,000 parts by weight of fused silica; wherein all parts by weight are based on 100 parts by weight total for the (meth)acrylate-capped poly(arylene ether)resin and the acryloyl monomer.

Another embodiment is a method of preparing a curable composition, comprising: blending a functionalized poly (arylene ether)resin; an acryloyl monomer; and a metallophosphorus flame retardant having the formula

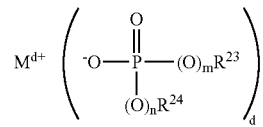

wherein M is Mg, Ca, Al, Sb, Sn, Ge, Ti, Zn, Fe, Zr, Ce, Bi, Sr, Mn, Li, Na, or K; d is 1, 2, 3, or 4 according to the identity of M and its oxidation state; each occurrence of $R^{23}$ and $R^{24}$ is independently $C_1$–$C_{18}$ hydrocarbyl, and each occurrence of m and n is 0 or 1, to form an intimate blend.

There is no particular limitation on the method by which the composition is prepared. The composition may be prepared by forming an intimate blend comprising the functionalized poly(arylene ether), the acryloyl monomer, and the metallophosphorus flame retardant. When the composition comprises an alkenyl aromatic monomer and a capped poly(arylene ether), the composition may be prepared directly from an unfunctionalized poly(arylene ether) by dissolving the uncapped poly(arylene ether) in a portion of the alkenyl aromatic monomer, adding a capping agent to form the capped poly(arylene ether) in the presence of the alkenyl aromatic monomer, and adding the acryloyl monomer, the metallophosphorus flame retardant, and any other components to form the thermoset composition.

There is no particular limitation on the method by which the composition may be cured. The composition may, for example, be cured thermally or by using irradiation techniques, including radio frequency heating, UV irradiation and electron beam irradiation. For example, the composition may be cured by initiating chain-reaction curing with 10 seconds of radio frequency heating. When heat curing is used, the temperature selected may be about 80° to about 300° C. The heating period may be about 5 seconds to about 24 hours. Curing may be staged to produce a partially cured and often tack-free resin, which then is fully cured by heating for longer periods or at higher temperatures.

One embodiment is a cured composition obtained by curing any of the above-described curable compositions. It will be understood that the term "curing" includes partially curing and fully curing. Because the components of the curable composition may react with each other during curing, the cured compositions may be described as comprising the reaction products of the curable composition components.

Another embodiment is an article comprising any of the cured compositions. The curable composition is useful for fabricating a wide range of articles, and it is particularly suitable for use as an encapsulant for electronic devices. The composition exhibits highly desirable properties. For example, in one embodiment, the cured composition may exhibit a UL94 flammability rating of V-1, preferably, V-0. The cured composition may exhibit a glass transition temperature of at least 120° C., preferably at least 130° C., more preferably at least 140 ° C. The cured composition also exhibits low moisture absorption that is highly reversible. The cured composition dried for 24 hours at 115° C. exhibits a weight difference less than ±0.05%, preferably less than ±0.02%, more preferably less than ±0.01%, after exposure to 168 hours at 85° C. and 85% relative humidity and redrying for 24 hours at 115° C. By less than ±0.05%, it is meant that the absolute value of the weight change is less than 0.05%.

The invention is further illustrated by the following non-limiting examples.

EXAMPLES 1 AND 2, COMPARATIVE EXAMPLES 1–3

Several compositions were prepared and molded using the components and amounts summarized in Table 1, where all amounts are expressed as parts by weight (pbw). A methacrylate-capped poly(2,6-dimethyl-1,4-phenylene ether) resin ("Methacrylate-capped PPE") having an intrinsic viscosity of about 0.3 deciliters per gram was prepared according to procedures described in U.S. Patent Application Publication No. 2001/0,053,820 A1 to Yeager et al. Fused silicas were obtained from Denka as FB-74 having an average particle size of 30.4 micrometers and a surface area of 1.6 meter$^2$/gram, and FS-20 having an average particle size of 5.0 micrometers and a surface area of 6.7 meter$^2$/gram. Hexanediol diacrylate was obtained from Sartomer as SR238. Trimethylolpropane trimethacrylate (TMPTMA) was obtained from Sartomer as SR350. Methacryloxypropyl trimethoxysilane (MAPTMS) was obtained from Dow Coming as Z-6030. A conductive carbon black was obtained as Printex XE-2 from Degussa. Triphenyl phosphate was obtained from Akzo Nobel. Piperazine bis(di-(2,6-dimethylphenyl)phosphonate) (sometimes referred to as piperazine diphosphonate ester) was prepared by the reaction of 2,6-dimethylphenol (GE Plastics) with phosphorus oxychloride in the presence of magnesium chloride to give xylyl dichlorophosphate, which was further reacted in methylene chloride solvent with piperazine (Aldrich) in the presence of triethylamine (Aldrich) to give the desired product. Aluminum tris(diethylphosphinate) was obtained as OP930 from Clariant. A dried colloidal powder of antimony pentoxide was obtained from Nyacol as Nyacol A1590.

Molding compounds were prepared as follows. The fused silicas were combined with the MAPTMS in a plastic container. The container was then placed into a two-axis, centrifugal mixer and allowed to mix for 15 seconds at 1400 rpm. The container was then allowed to stand and cool for 5 minutes. After cooling, the methacrylate-capped poly(2,6-dimethyl-1,4-phenylene ether) was added to the container, which was again placed in the centrifugal mixer and allowed to mix for 15 seconds at 1400 rpm, allowed to stand and cool for 1 minute, and then mixed again for 15 seconds at 1400 rpm. The remaining components of the formulation were then added and the resulting mixture was gently folded together with a spatula. After folding, the mixture was again placed in the centrifugal mixer and allowed to mix for 15 second at 1400 rpm. After the compound was allowed to cool, it was placed in a two-roll mill for further mixing. The mill utilized a chilled roll (35° C.) and a hot roll (50–70° C.) and ran at a speed of about 8–16 meters/minute and roll ratio of 1:1–2:1. The gap in the nip was set initially at 0.5 millimeters and was decreased to 0.25 millimeters as mixing progressed. The molding compound was allowed to mix on the two-roll mill for 6–10 minutes, during which the compound was cut from the roll 10 times. After mixing was complete, the compound was cut from the two-roll mill and placed in a sealed jar for storage in a freezer.

Test samples ("coupons") were prepared from the molding compound by first compression molding the material into 3.175 millimeter thick disks, and then cutting the disks into the appropriately sized bars for testing. Compression molding of the molding compound was performed at 150° C. under a pressure of 4.82–6.89 megapascals. A cure time of 5 minutes was sufficient for the 3.175 millimeter thick part. After compression molding, the plaques were post-cured in a circulating air oven at 175° C. for 1 hour. After post-curing the 3.175 millimeter thick plaques were cut into 1.27 centimeter wide strips using a diamond-wheeled wet saw of the kind typically used for cutting ceramic floor tile. The 1.27 centimeter wide by 3.175 millimeter thick strips were then cut to length for testing. After cutting was completed, the coupons were washed thoroughly with isopropyl alcohol and dried in an open-air oven for one to two hours at 110° C. Coupons used for moisture gain testing were then sanded smooth on their cut edges using 180, 220, and then 400 grit sandpaper. The molded surfaces were not sanded. After sanding was completed, the coupons were again cleaned in isopropyl alcohol and again dried in an open-air oven at 110° C. for 2 hours.

Flammability testing was conducted according to Underwriter's Laboratory procedure UL94. Glass transition temperatures ($T_g$) and coefficients of thermal expansion (CTE) were determined by thermal mechanical analysis according to ASTM D6341. CTE values are expressed in units of parts per million (ppm), which are equivalent to micrometers/meter/° C. Thermal Mechanical Analysis (TMA) was performed on a TA 2950 TMA Thermo Mechanical Analyzer. Experimental parameters were set at: 0.05 Newton of force, nitrogen purge, and 1.0 sec/point sampling interval. The sample temperature was ramped at 5° C./min from 25° C. to 250° C. then cooled at 10° C./min to 0° C. The second heat ramped from 0° C. at 5° C./min to 250° C. Data was reported from the second heat. CTE values were measured both above and below the glass transition temperature.

Moisture absorption of the materials was determined by measuring the weight of a given coupon before and after conditioning in a controlled humidity chamber. Prior to conditioning the coupons were cut to the dimensions of 6.35×1.27×0.3175 centimeters, dried for 1 hour at 115° C., and then weighed to the nearest 0.0001 gram. After conditioning for 168 hours, at 85° C. and 85% relative humidity, the coupons were immediately weighed and then allowed to dry overnight at ambient conditions. Following the overnight dry, the coupons were placed in an open-air oven for 2 hours at 115° C. and then immediately weighed. Weight changes are expressed in Table 1 as a percentage relative to the pre-weighed value.

All property results are summarized in Table 1. The UL94 flammability results show that the metallophosphorus flame retardant is more effective, on a weight basis, than either triphenyl phosphate or the piperazine phosphate compound. Only the compositions with the metallophosphorus flame retardant achieved the highly desirable V-0 rating. The results also show that the compositions with metallophosphorus flame retardant closely approach their initial weight after exposure to high humidity followed by re-drying. In contrast, the compositions with triphenyl phosphate lost weight, possibly because of volatilization of the triphenyl phosphate, and the composition with the piperazine phosphate gained weight, possibly because of irreversible water absorption.

TABLE 1

| | Ex. 1 | Ex. 2 | C. Ex. 1 |
|---|---|---|---|
| Composition | | | |
| Fused silica FB-74 | 66.40 | 66.40 | 66.40 |
| Fused silica FS-20 | 16.60 | 16.60 | 16.60 |
| Methacrylate-capped PPE | 4.25 | 4.10 | 3.97 |
| Dicumyl peroxide | 0.32 | 0.32 | 0.32 |
| Carbon black | 0.20 | 0.20 | 0.20 |
| 4-t-Butyl catechol | 0.04 | 0.04 | 0.04 |
| Hexanediol diacrylate | 7.89 | 7.62 | 7.37 |
| TMPTMA | 2.20 | 2.12 | 2.05 |
| MAPTMS | 0.50 | 0.50 | 0.50 |
| Aluminum tris(diethylphosphinate) | 1.60 | 2.10 | 0 |
| Piperazine diphosphonate ester | 0 | 0 | 2.55 |
| Triphenyl phosphate | 0 | 0 | 0 |
| Properties | | | |
| Total burn time for 5 samples (sec) | 17.5 | 2.4 | 37.1 |
| Average burn time per sample (sec) | 3.5 | 0.5 | 15.1 |
| Continuous Burn? | no | no | no |
| Drip? | no | no | no |
| UL 94 rating | V-0 | V-0 | V-1 |
| $T_g$ (° C.) | 144 | 144 | 110 |
| CTE < $T_g$ (ppm) | 14 | 12 | 15 |
| CTE > $T_g$ (ppm) | 22 | 22 | 22 |
| weight change after 168 hours at 85° C./85% RH (%) | +0.200 ± 0.004 | +0.211 ± 0.002 | +0.194 ± 0.006 |
| weight change after redrying (%) | +0.002 ± 0.004 | −0.007 ± 0.003 | +0.066 ± 0.008 |

TABLE 1-continued

| | C. Ex. 2 | C. Ex. 3 |
|---|---|---|
| Composition | | |
| Fused silica FB-74 | 66.40 | 66.40 |
| Fused silica FS-20 | 16.60 | 16.60 |
| Methacrylate-capped PPE | 4.25 | 4.10 |
| Dicumyl peroxide | 0.32 | 0.32 |
| Carbon black | 0.20 | 0.20 |
| 4-t-Butyl catechol | 0.04 | 0.04 |
| Hexanediol diacrylate | 7.89 | 7.62 |
| TMPTMA | 2.20 | 2.12 |
| MAPTMS | 0.50 | 0.50 |
| Aluminum tris(diethylphosphinate) | 0 | 0 |
| Piperazine diphosphonate ester | 0 | 0 |
| Triphenyl phosphate | 1.60 | 2.10 |
| Properties | | |
| Total burn time for 5 samples (sec) | 271.4 | 78.3 |
| Average burn time per sample (sec) | 54.3 | 15.7 |
| Continuous burn? | yes | no |
| Drip? | no | no |
| UL 94 rating | no ranking | no ranking |
| $T_g$ (° C.) | 101 | 89 |
| CTE < $T_g$ (ppm) | 16 | 18 |
| CTE > $T_g$ (ppm) | 19 | 12 |
| weight change after 168 hours at 85° C./85% RH (%) | +0.156 ± 0.012 | +0.091 ± 0.042 |
| weight change after redrying (%) | −0.011 ± 0.008 | −0.053 ± 0.004 |

EXAMPLES 3–11

A composition was prepared and molded according to the procedure described above. Cyclohexanedimethanol diacrylate was obtained from Sartomer as CD 406. A partially calcium saponified glycolic ester of montanic acid (montan wax) in a micronized form was obtained as CERIDUST® 5551 from Clariant. A fused silica having a median particle size of 17.7 micrometers and a surface area of 3.1 meter²/gram was obtained as FB-570 from Denka. Another fused silica having a median particle size of 0.7 micrometers and a surface area of 6.2 meter²/gram was obtained as SFP-30M from Denka. A colorant blend consisted of 57 parts of red colorant obtained as SANDOPLAST® Red G and 43 parts of green colorant obtained as SANDOPLAST® Green GSB, both from Clariant. Compositions are summarized in Table 2. Spiral flow length was determined using a spiral flow mold with a channel depth of 0.762 millimeters and a Gluco molding machine. Conditions used for the measurements were: platen temperature, 165° C.; mold temperature, 150° C.; injection pressure, 6.89 megapascals; injection speed and time varied with the composition, but an injection speed of about 7.62 centimeters/second was typical, as was an injection time of about 6 seconds; cycle time, 180 seconds. The composition may be ground to a dry powder, or converted to a hard pellet. Shore D hardness of pellets was measured according to ASTM D2240. A qualitative friability test was conducted by grinding the composition using a mortar and pestle, and sieving the resulting powder to a maximum particle size of 600 micrometers. A composition was judged to be friable if the composition was easily ground into a dry powder and the powder did not self-sinter after 24 hours storage at room temperature (i.e., it remained a finely ground powder). Properties are summarized in Table 2. The results show that the compositions exhibit high spiral flow, and that they are suitable for handling as either pellets or powders.

TABLE 2

|  | Ex. 3 | Ex. 4 | Ex. 5 | Ex. 6 | Ex. 7 |
|---|---|---|---|---|---|
| Composition |  |  |  |  |  |
| Methacrylate-capped PPE, IV = 0.12 | 13.18 | 0 | 25.28 | 22.12 | 18.96 |
| Methacrylate-capped PPE, IV = 0.30 | 0 | 13.18 | 0 | 0 | 0 |
| Cyclohexanedimethanol diacrylate | 52.71 | 52.71 | 37.91 | 41.07 | 44.23 |
| Montan wax | 0 | 0 | 2.7 | 2.7 | 2.7 |
| Dicumyl peroxide | 2.15 | 2.15 | 2.15 | 2.15 | 2.15 |
| 4-t-Butyl catechol | 0.13 | 0.13 | 0.13 | 0.13 | 0.13 |
| Aluminum tris(diethylphosphinate) | 7.56 | 7.56 | 7.56 | 7.56 | 7.56 |
| Fused silica FB-570 | 417.474 | 417.474 | 417.474 | 417.474 | 417.474 |
| Fused silica SFP-30M | 46.386 | 46.386 | 46.386 | 46.386 | 46.386 |
| Colorant | 0.54 | 0.54 | 0.54 | 0.54 | 0.54 |
| Properties |  |  |  |  |  |
| Spiral Flow (meters) | 1.54 | 0.27 | 0.42 | 0.53 | 0.61 |
| Pellet Hardness (Shore D durometer) | 44 | — | 55 | 55 | 55 |
| Friable? | yes | yes | yes | yes | yes |

|  | Ex. 8 | Ex. 9 | Ex. 10 | Ex. 11 |
|---|---|---|---|---|
| Composition |  |  |  |  |
| Methacrylate capped PPE, IV = 0.12 | 15.80 | 12.64 | 0 | 6.32 |
| Methacrylate capped PPE, IV = 0.30 | 0 | 0 | 9.48 | 6.32 |
| Cyclohexanedimethanol diacrylate | 47.39 | 50.55 | 53.71 | 50.55 |
| Montan wax | 2.7 | 2.7 | 2.7 | 2.7 |
| Dicumyl peroxide | 2.15 | 2.15 | 2.15 | 2.15 |
| 4-t-Butyl catechol | 0.13 | 0.13 | 0.13 | 0.13 |
| Aluminum tris(diethylphosphinate) | 7.56 | 7.56 | 7.56 | 7.56 |
| Fused silica FB-570 | 417.474 | 417.474 | 417.474 | 417.474 |
| Fused silica SFP-30M | 46.386 | 46.386 | 46.386 | 46.386 |
| Colorant | 0.54 | 0.54 | 0.54 | 0.54 |
| Properties |  |  |  |  |
| Spiral Flow (meters) | 0.66 | 0.90 | — | 0.46 |
| Pellet Hardness (Shore D durometer) | — | — | — | — |
| Friable? | yes | yes | — | yes |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A curable composition, comprising:
   a functionalized poly(arylene ether)resin;
   an acryloyl monomer; and
   a metallophosphorus flame retardant having the formula

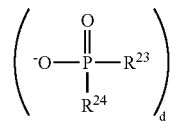

wherein M is Mg, Ca, Al, Sb, Sn, Ge, Ti, Zn, Fe, Zr, Ce, Bi, Sr, Mn, Li, Na, or K; d is 1, 2, 3, or 4 according to the identity of M and its oxidation state; and each occurrence of $R^{23}$ and $R^{24}$ is independently $C_1$–$C_{18}$ hydrocarbyl.

2. The composition of claim 1, wherein the functionalized poly(arylene ether)resin is a capped poly(arylene ether)resin having the formula $$Q(J\text{-}K)_y$$

wherein Q is the residuum of a monohydric, dihydric, or polyhydric phenol; y is 1 to 100; J comprises repeating structural units having the formula

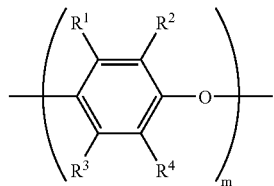

wherein $R^1$ and $R^3$ are each independently selected from the group consisting of hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; $R^2$ and $R^4$ are each independently selected from the group consisting of halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ hydrocarbyloxy, and $C_2$–$C_{12}$ halohydrocarbyloxy wherein at least two carbon atoms separate the halogen and oxygen atoms; m is 1 to about 200; and K is a capping group selected from the group consisting of

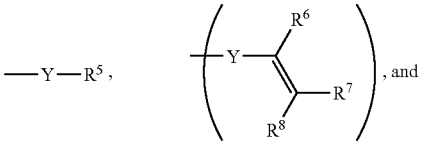, and

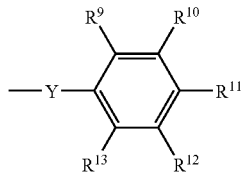

wherein $R^5$ is $C_1$–$C_{12}$ alkyl; $R^6$–$R^8$ are each independently selected from the group consisting of hydrogen, $C_1$–$C_{18}$ hydrocarbyl, $C_2$–$C_{18}$ hydrocarbyloxycarbonyl, nitrile, formyl, carboxylate, imidate, and thiocarboxylate; $R^9$–$R^{13}$ are each independently selected from the group consisting of hydrogen, halogen, $C_1-C_{12}$ alkyl, hydroxy, and amino; and wherein Y is a divalent group selected from the group consisting of

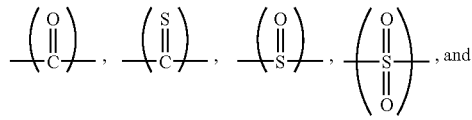

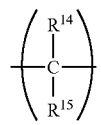

wherein $R^{14}$ and $R^{15}$ are each independently selected from the group consisting of hydrogen and $C_1-C_{12}$ alkyl.

3. The curable composition of claim 2, wherein Q is the residuum of a monohydric phenol.

4. The curable composition of claim 1, wherein the capped poly(arylene ether) comprises at least one capping group having the structure

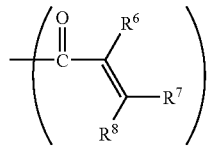

wherein $R^6-R^8$ are each independently selected from the group consisting of hydrogen, $C_1-C_{18}$ hydrocarbyl, $C_2-C_{12}$ hydrocarbyloxycarbonyl, nitrile, formyl, carboxylate, imidate, and thiocarboxylate.

5. The curable composition of claim 4, wherein $R^6$ is hydrogen or methyl, and $R^7$ and $R^8$ are hydrogen.

6. The curable composition of claim 1, comprising about 5 to about 90 parts by weight of the functionalized poly (arylene ether) per 100 parts by weight total of the functionalized poly(arylene ether) and the acryloyl monomer.

7. The composition of claim 1, wherein the acryloyl monomer comprises at least one acryloyl moiety having the structure

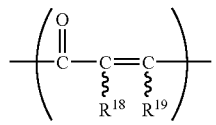

wherein $R^{18}$ and $R^{19}$ are each independently selected from the group consisting of hydrogen and $C_1-C_{12}$ alkyl, and wherein $R^{18}$ and $R^{19}$ may be disposed either cis or trans about the carbon-carbon double bond.

8. The composition of claim 1, wherein the acryloyl monomer comprises at least one acryloyl moiety having the structure

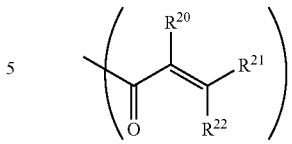

wherein $R^{20}-R^{22}$ are each independently selected from the group consisting of hydrogen, $C_1-C_{12}$ hydrocarbyl, $C_2-C_{18}$ hydrocarbyloxycarbonyl, nitrile, formyl, carboxylate, imidate, and thiocarboxylate.

9. The composition of claim 8, wherein the acryloyl monomer comprises at least two acryloyl moieties.

10. The composition of claim 8, wherein the acryloyl monomer comprises at least three acryloyl moieties.

11. The composition of claim 1, wherein the acryloyl monomer comprises trimethylolpropane tri(meth)acrylate, 1,6-hexanediol di(meth)acrylate, neopentyl glycol di(meth) acrylate, ethylene glycol di(meth)acrylate, propylene glycol di(meth)acrylate, cyclohexanedimethanol di(meth)acrylate, butanediol di(meth)acrylate, diethylene glycol di(meth) acrylate, triethylene glycol di(meth)acrylate, isobornyl (meth)acrylate, methyl(meth)acrylate, methacryloxypropyl trimethoxysilane, ethoxylated (2) bisphenol A di(meth)acrylate, or a mixture of at least two of the foregoing acryloyl monomers.

12. The composition of claim 1, comprising about 10 to about 95 parts acryloyl monomer per 100 parts by weight total of the functionalized poly(arylene ether) and the acryloyl monomer.

13. The composition of claim 1, wherein each occurrence of $R^{23}$ and $R^{24}$ is independently $C_1-C_6$ alkyl.

14. The composition of claim 1, wherein each occurrence of $R^{23}$ and $R^{24}$ is methyl or ethyl.

15. The composition of claim 1, wherein M is aluminum and each occurrence of m and n is zero.

16. The composition of claim 1, wherein the metallophosphorus flame retardant is aluminum tris(diethylphosphinate).

17. The composition of claim 1, comprising about 0.1 to about 50 parts by weight of the metallophosphorus flame retardant per 100 parts by weight total of the functionalized poly(arylene ether) and the acryloyl monomer.

18. The composition of claim 1, further comprising an aromatic bisphosphoramidate flame retardant of the formula

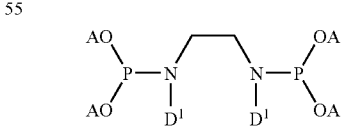

wherein A is a monocyclic aromatic radical and $D^1$ is a $C_{1-4}$ primary or secondary alkyl radical or both $D^1$ radicals taken together are ethylene.

19. The composition of claim 1, further comprising an aromatic polyphosphate flame retardant having the formula

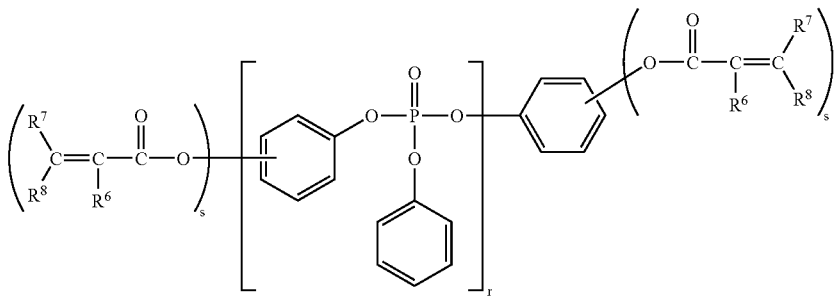

wherein each occurrence of $R^6$–$R^8$ is independently selected from the group consisting of hydrogen, $C_1$–$C_{18}$ hydrocarbyl, $C_2$–$C_{12}$ hydrocarbyloxycarbonyl, nitrile, formyl, carboxylate, imidate, and thiocarboxylate; r is 2 to about 20; and each occurrence of s is 0, 1, or 2, with the proviso that at least one occurrence of s is 1.

20. The composition of claim 1, further comprising an alkenyl aromatic compound having the formula

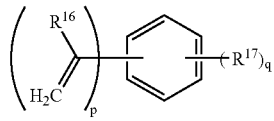

wherein each occurrence of $R^{16}$ is independently hydrogen or $C_1$–$C_{18}$ hydrocarbyl; each occurrence of $R^{17}$ is independently halogen, $C_1$–$C_{12}$ alkyl, $C_1$–$C_{12}$ alkoxyl, or $C_6$–$C_{18}$aryl; p is 1 to 4; and q is 0 to 5.

21. The curable composition of claim 20, wherein the alkenyl aromatic monomer is selected from the group consisting of styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and combinations thereof.

22. The composition of claim 20, comprising about 10 to about 500 parts by weight alkenyl aromatic monomer per 100 parts by weight total of the functionalized poly(arylene ether) and the acryloyl monomer.

23. The composition of claim 1, further comprising an allylic monomer.

24. The composition of claim 23, wherein the allylic monomer is selected from diallyl phthalate, diallyl isophthalate, triallyl mellitate, triallyl mesate, triallyl benzenes, triallyl cyanurate, triallyl isocyanurate, and mixtures thereof.

25. The composition of claim 23, comprising about 10 to about 500 parts by weight allylic monomer per 100 parts by weight total of the functionalized poly(arylene ether) and the acryloyl monomer.

26. The curable composition of claim 1, further comprising about 5 to about 95 weight percent of a particulate filler, based on the total weight of the composition.

27. The curable composition of claim 26, wherein the particulate filler is fused silica.

28. The curable composition of claim 26, wherein the particulate filler comprises a first fused silica having an average particle size of about 0.03 micrometer to less than 1 micrometer, and a second fused silica having an average particle size greater than 1 micrometer to about 30 micrometers.

29. The curable composition of claim 1, further comprising a curing catalyst.

30. The curable composition of claim 29, wherein the curing catalyst is selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl) benzene, 2,5-dimethyl-2,5-di(t-butylperoxy)hexane, di(t-butylperoxy)isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, trimethylsilylphenyltriphenylsilyl peroxide, and mixtures thereof.

31. The curable composition of claim 1, further comprising a curing inhibitor.

32. The curable composition of claim 31, wherein the curing inhibitor is selected from the group consisting of diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, $C_1$–$C_6$-alkyl-substituted catechols, dialkylhydroquinone, 2,4,6-dichloronitrophenol, halogen-ortho-nitrophenols, alkoxyhydroquinone, mono- and di- and polysulfides of phenols and catechols, thiols and oximes and hydrazones of quinone, phenothiazine, dialkylhydroxylamines, and combinations thereof.

33. The curable composition of claim 1, further comprising an additive selected from the group cosisting of dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, and combinations thereof.

34. A curable composition, comprising:
a (meth)acrylate-capped poly(2,6-dimethyl-1,4-phenylene ether)resin, a (meth)acrylate-capped poly(2,6-dimethyl-1,4-phenylene ether-co-2,3,6-trimethyl-1,4-phenylene ether)resin, or a mixture thereof;
an acryloyl monomer selected from the group cosisting of trimethylolpropane tri(meth)acrylate, hexanediol di(meth)acrylate, cyclohexanedimethanol di(meth acrylate, methacryloxypropyl trimethoxysilane, ethoxylated (2) bisphenol A dimethacrylate, and mixtures thereof;

an aluminophosphorus flame retardant having the formula

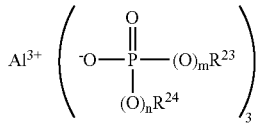

wherein each occurrence of $R^{23}$ and $R^{24}$ is independently $C_1$–$C_6$ alkyl, and each occurrence of m and n is 0; and fused silica.

35. The curable composition of claim 34, further comprising a curing catalyst.

36. A cured composition, comprising the reaction product obtained by curing the curable composition of claim 34.

37. A curable composition, comprising:
about 5 to about 40 parts by weight of a (meth)acrylate-capped poly(2,6-dimethyl-1,4-phenylene ether)resin, a (meth)acrylate-capped poly(2,6-dimethyl-1,4-phenylene ether-co-2,3,6-trimethyl-1,4-phenylene ether) resin, or a mixture thereof;
about 60 to about 95 parts by weight of an acryloyl monomer selected from the group cosisting of trimethylolpropane tri(meth)acrylate, hexanediol di(meth) acrylate, cyclohexanedimethanol di(meth)acrylate, methacryloxypropyl trimethoxysilane, ethoxylated (2) bisphenol A di(meth)acrylate, and mixtures thereof;
about 1 to about 50 parts by weight of aluminum tris (diethylphosphinate); and
about 100 to about 2,000 parts by weight of fused silica;
wherein all parts by weight are based on 100 parts by weight total for the (meth)acrylate-capped poly(arylene ether)resin and the acryloyl monomer.

38. The curable composition of claim 37, further comprising a curing catalyst.

39. A cured composition, comprising the reaction product obtained by curing the curable composition of claim 37.

40. A cured composition, comprising the reaction product obtained by curing the curable composition of claim 1.

41. The cured composition of claim 40, having a UL94 rating of V-0 or V-1.

42. The cured composition of claim 40, having a glass transition temperature of at least 120° C.

43. The cured composition of claim 40, wherein the composition dried for 24 hours at 115° C. exhibits a weight difference less than ±0.05% after exposure to 168 hours at 85° C. and 85% relative humidity and redrying for 24 hours at 115° C.

44. An article comprising the cured composition of claim 36.

45. An article comprising the cured composition of claim 39.

46. An article comprising the cured composition of claim 40.

47. A method of preparing a curable composition, comprising:
blending
a functionalized poly(arylene ether)resin;
an acryloyl monomer; and
a metallophosphorus flame retardant having the formula

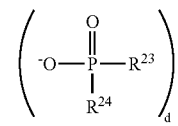

wherein M is Mg, Ca, Al, Sb, Sn, Ge, Ti, Zn, Fe, Zr, Ce, Bi, Sr, Mn, Li, Na, or K; d is 1, 2, 3, or 4 according to the identity of M and its oxidation state; and each occurrence of $R^{23}$ and $R^{24}$ is independently $C_1$–$C_{18}$ hydrocarbyl,
to form an intimate blend.

* * * * *

UNITED STATES PATENT AND TRADEMARK OFFICE
CERTIFICATE OF CORRECTION

PATENT NO. : 7,101,923 B2
APPLICATION NO. : 10/678471
DATED : September 5, 2006
INVENTOR(S) : John Robert Campbell et al.

It is certified that error appears in the above-identified patent and that said Letters Patent is hereby corrected as shown below:

Column 8,
Line 56, after "to", delete "Zamoch" and insert therefor --Zarnoch--.

Column 9,
Line 13, after "di(meth)acrylate", delete "isobomyl" and insert therefor --isobornyl--

Column 16,
Line 26, after "to", delete "abut" and insert therefor --about--.
Line 30, after "about", delete "9" and insert therefor --90--.

Column 24,
Line 26, after "di(meth)acrylate", delete "isobomyl" and insert therefor --isobornyl--.
Line 42, delete "and each occurrence of m and n is zero."

Column 25,
Line 52, after "from", insert --the group consisting of--.

Column 26,
Line 52, after "group", delete "cosisting" and insert therefor --consisting--.
Line 65, after "group", delete "cosisting" and insert therefor --consisting--.

Column 27,
Line 27, after "group", delete "cosisting" and insert therefor --consisting--.

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,101,923 B2 | Page 1 of 1 |
| APPLICATION NO. | : 10/678471 | |
| DATED | : September 5, 2006 | |
| INVENTOR(S) | : John R. Campbell et al. | |

It is certified that error appears in the above-identified patent and that said Letters Patent is hereby corrected as shown below:

Column 9:
Line 52, after "$Sn^{4+}$", delete "$G^{4+}$" and insert therefor --$Ge^{4+}$--.

Signed and Sealed this

Twentieth Day of March, 2007

JON W. DUDAS
*Director of the United States Patent and Trademark Office*